United States Patent
Bovio et al.

(10) Patent No.: US 6,724,623 B2
(45) Date of Patent: Apr. 20, 2004

(54) WEDGE-SHAPED PORT REPLICATOR FOR PORTABLE COMPUTER

(75) Inventors: Michele Bovio, Boston, MA (US); Allan Scott Baucom, Townsend, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/201,105

(22) Filed: Jul. 23, 2002

(65) Prior Publication Data

US 2002/0181199 A1 Dec. 5, 2002

Related U.S. Application Data

(63) Continuation of application No. 09/138,319, filed on Aug. 21, 1998, now Pat. No. 6,424,524.

(51) Int. Cl.[7] .............................. G06F 1/16; H05K 5/02
(52) U.S. Cl. ...................... 361/686; 361/683; 710/303
(58) Field of Search ............................... 361/683–686; 710/303, 304; 320/107, 113; 439/159; 312/223.1, 223.2

(56) References Cited

U.S. PATENT DOCUMENTS

| | | | | |
|---|---|---|---|---|
| 5,313,596 A | * | 5/1994 | Swindler et al. ............ | 710/303 |
| 5,436,792 A | | 7/1995 | Leman et al. ............... | 361/686 |
| 5,460,547 A | * | 10/1995 | Belt et al. .................... | 361/686 |
| 5,555,491 A | | 9/1996 | Tao .............................. | 361/686 |
| 5,568,359 A | | 10/1996 | Cavello et al. ............. | 361/686 |
| 5,633,782 A | * | 5/1997 | Goodman et al. .......... | 361/683 |
| 5,694,292 A | | 12/1997 | Paulsel et al. .............. | 361/686 |
| 5,745,341 A | | 4/1998 | Wolff et al. ................ | 361/682 |
| 5,768,101 A | | 6/1998 | Cheng ......................... | 361/687 |
| 5,805,412 A | | 9/1998 | Yanagisawa et al. ....... | 361/686 |
| 5,859,762 A | | 1/1999 | Clark et al. ................. | 361/686 |
| 5,864,294 A | * | 1/1999 | Hsu et al. .................... | 361/686 |
| 5,933,812 A | | 8/1999 | Meyer et al. ................. | 705/15 |
| 5,966,285 A | * | 10/1999 | Sellers ........................ | 361/686 |
| 6,028,767 A | | 2/2000 | Lan ............................. | 361/686 |
| 6,046,571 A | | 4/2000 | Bovio et al. ................ | 320/113 |
| 6,061,233 A | | 5/2000 | Jung ............................ | 361/686 |
| 6,101,087 A | * | 8/2000 | Sutton et al. ............... | 361/686 |
| 6,119,184 A | | 9/2000 | Takahama ................... | 710/101 |
| 6,151,218 A | | 11/2000 | Pirdy et al. ................. | 361/727 |
| 6,185,096 B1 | | 2/2001 | Helot et al. ................. | 361/686 |
| 6,556,436 B2 | * | 4/2003 | Ohnishi ....................... | 361/686 |

* cited by examiner

Primary Examiner—Lisa Lea-Edmonds

(57) ABSTRACT

A docking unit for a portable computer has a wedge-shaped. As a result, a portable computer, which has been installed on the docking unit, is inclined toward the user. This places the keyboard of the portable computer at a more comfortable angle for typing. Thus, the portable computer's keyboard remains usable even when it is installed on the docking unit. Moreover, the wedge-shape need not substantially raise the height of the keyboards since the leading edge is relatively thin, keeping the computer's keyboard as a comfortable height.

19 Claims, 8 Drawing Sheets

WEDGE-SHAPED PORT REPLICATOR FOR PORTABLE COMPUTER

This is a continuation of application Ser. No. 09/138,319 filed on Aug. 21, 1998 now U.S. Pat. No. 6,424,524.

BACKGROUND OF THE INVENTION

Portable computer docking units have been marketed as devices that allow the user to have the advantages of a portable computer without any of the portable computer's limitations, at least when operating at the user's desk or other primary work location.

In the typical implementation, the docking unit is located at the user's office. The docking unit has a docking bay for receiving and providing electrical connections to the portable computer. The docking unit may also have a bus extension that electrically mates with the portable computer's bus when it is in the docking bay and a number of expansion slots to hold hard drives, CD-ROMs, modems etc., which are not found in the portable computer. As a result, when the portable computer is installed in the docking unit, its minimalist portable computer capabilities are augmented and extended to those that are typically found in most desktop or non-portable computer systems. In this way, the user has the advantages associated with the portable computer while not losing the functionality that would otherwise be available from a desktop computer system.

Most docking units also have port replication functionality. Many times the portable computer will be outfitted with a variety of communication ports, including serial ports, parallel ports, universal serial bus ports (USB), video ports, RJ45 network ports, etc. These ports are accessed through port connectors, usually on the back of the computer. It is typical for the docking unit to have a similar array of port connectors so that when the portable computer is connected to the docking unit, the portable computer's communication ports are tied to the analogous port connectors in the docking unit. In the parlance of the industry, the portable computer's communication ports are replicated in the docking unit. The advantage of this system is that the user can connect such components as a network interface, full size keyboard, mouse, and full size monitor to the port connectors of the docking unit. The docked portable computer thus connects to these various devices, but the mere act of undocking the portable computer serves to disconnect the computer from these various devices, in one step.

Some docking units are intended primarily as port replicators. These devices will not have the bus extensions, and consequently, the expansion slots, to support additional active bus devices for the portable computer. Instead, they are primarily intended to perform the port replication function. While obviously not having all of the advantages associated with the more elaborate docking units, port replicators provide the user with many of the core advantages of a desktop docking unit, such as the possibility of using a full size keyboard and desktop monitor and offering these features at a reasonable price point in a system with a small footprint.

SUMMARY OF THE INVENTION

One of the main disadvantages associated with docking units is that they effectively require the user to connect a full size keyboard to the docking unit. Some docking units prevent access to the portable computer's keyboard, when installed on the dock, and among the class of units that do allow access the portable's keyboard, the docking unit will have some thickness such that when the portable computer is connected onto it, the portable computer's keyboard is raised to the height at which it is uncomfortable for typing, when many desktops are already uncomfortably high for proper typing posture. In many ways, however, this is unfortunate because the newer keyboards offered by portable computers are otherwise very useful such that full size separate keyboards offer few incremental advantages. Moreover, even if the docking unit is relatively thin, it will not be at the proper typing angle. Many portable computers have folding legs under the rear portion of the portable computer's base. This allows the user to incline the keyboard for a more comfortable typing angle. Typically, however, installation of the portable computer in the docking bay of the docking unit necessitates the folding of these legs. Thus, even if the keyboard of the portable computer, when installed on the docking unit, can be located at the proper height, its angle will be uncomfortable for the user.

The present invention is directed to a docking unit for a portable computer. According to the invention, it is wedge-shaped. As a result, a portable computer, which has been installed on the docking unit, is inclined toward the user. This places the keyboard of the portable computer at a more comfortable angle for typing. Thus, the portable computer's keyboard remains usable even when it is installed on the docking unit. Moreover, the wedge-shape need not substantially raise the height of the keyboard since the leading edge is relatively thin.

In the preferred embodiment, the docking unit is a port replicator. As such, it replicates communication ports of the portable computer, enabling the portable computer to be disconnected from peripheral devices on the replicator's ports by disconnecting the portable computer from the docking unit. Specifically, the docking unit replicates parallel ports, serial ports, USB ports, keyboard ports, network ports, and video ports of the portable computer as corresponding replicated ports on the docking unit. The communication ports of the portable computer are connected to the replicated port connectors of the docking unit via a combination connector. Preferably, the combination connector of the docking unit mates with a compatible connector on the portable computer as the portable computer is installed in the docking bay of the docking unit.

In the preferred implementation, the docking unit comprises a wall that projects in front of the communication port connectors of the portable computer when the computer is installed on the docking unit. This prevents access to the portable computer's port connectors by the user, thereby requiring the user to use the replicated port connectors of the docking unit and preventing incompatible electrical connections to both port connectors simultaneously.

In general, according to another aspect, the invention also features a method for docking a portable computer. This method comprises providing a docking unit with a wedge cross-section. Consequently, installation of the portable computer on the docking unit's docking bay inclines a keyboard of the portable computer towards the user to thereby provide a more comfortable angle for typing.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
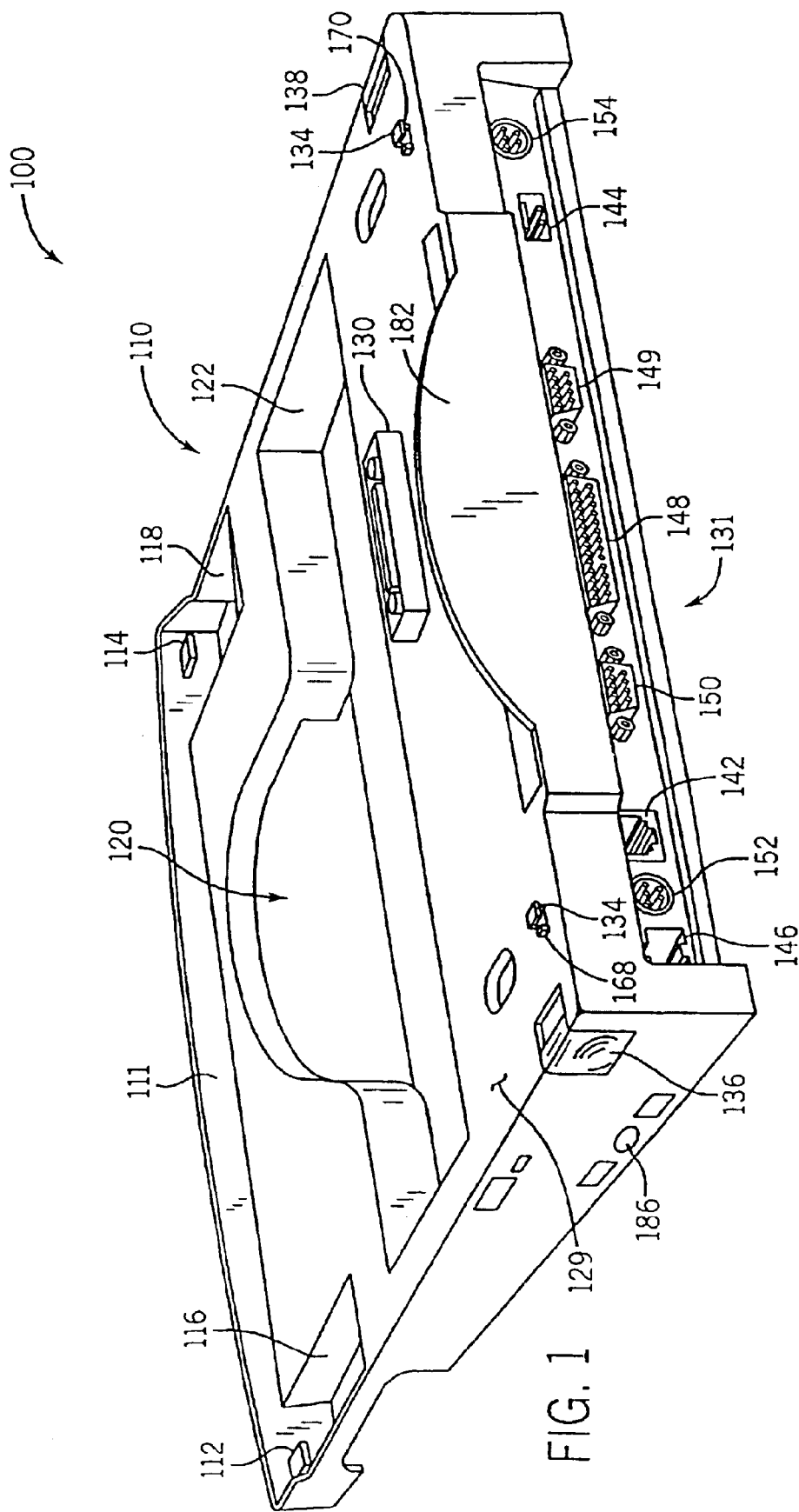
FIG. 1 is a perspective view showing the rear portion of a port replicator, according to the present invention.

FIG. 1 shows a port replicator docking unit, which has been constructed according to the principles of the present invention.

Generally, the port replicator 100 comprises a computer docking bay 110, which is configured to receive a compatible portable computer on the port replicator 100. To this end, the right and left tabs 112, 114 are provided on a front wall 111 of the docking unit 100. The tabs 112, 114 project rearward from the front wall 111 and are located over wells 116, 118.

Figure 1A:
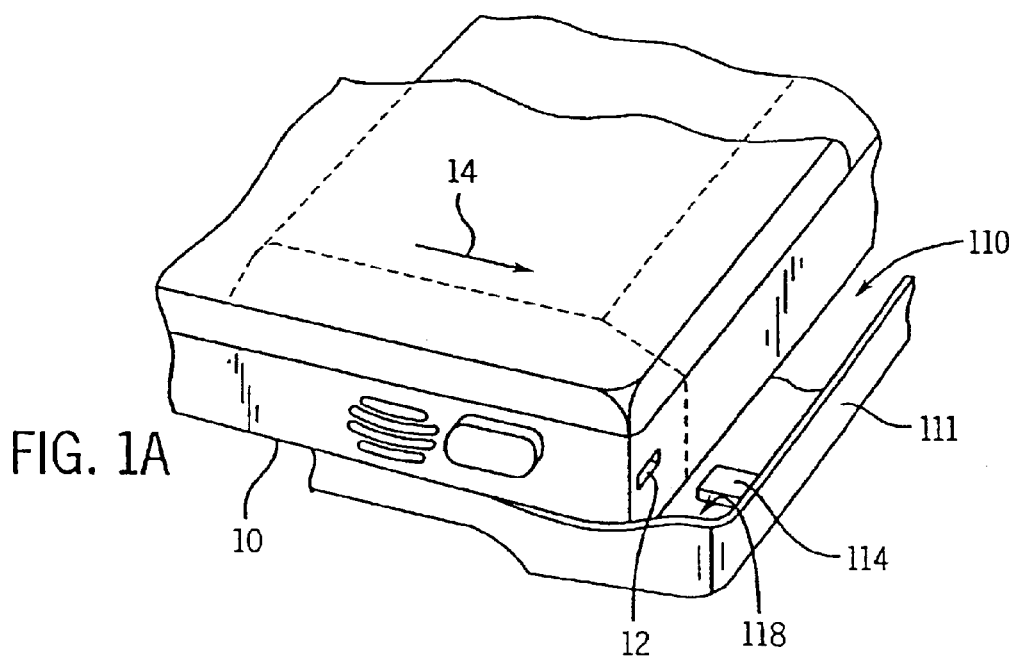
FIG. 1A is a perspective view detailing the technique used to connect the front of the computer system with the port replicator.

As detailed in FIG. 1A, tabs 112, 114 mate with rectangular recesses on the front of a compatible portable computer 10, allowing the front of the portable computer to be physically connected into the docking unit. Specifically, the portable computer 10 is aligned in the computer docking bay area 110 so that the rectangular recesses 12 in the portable computer's housing are aligned in front of each of the projecting tabs 112, 114. The computer is then moved in the direction of arrow 14 so that the tabs 112, 114 engage the recesses 12. This connection has the effect of hinging the front of the computer 10 to the port replicator 100.

Returning to FIG. 1, in the central section of the docking unit 100, a cutout 120 is formed. In the preferred embodiment, this extends entirely through the docking unit. This has the advantage of providing an easy means for carrying the docking unit, forming an improvised handle. Rearward of the cutout 120 is battery charging cradle 122.

Figure 2:
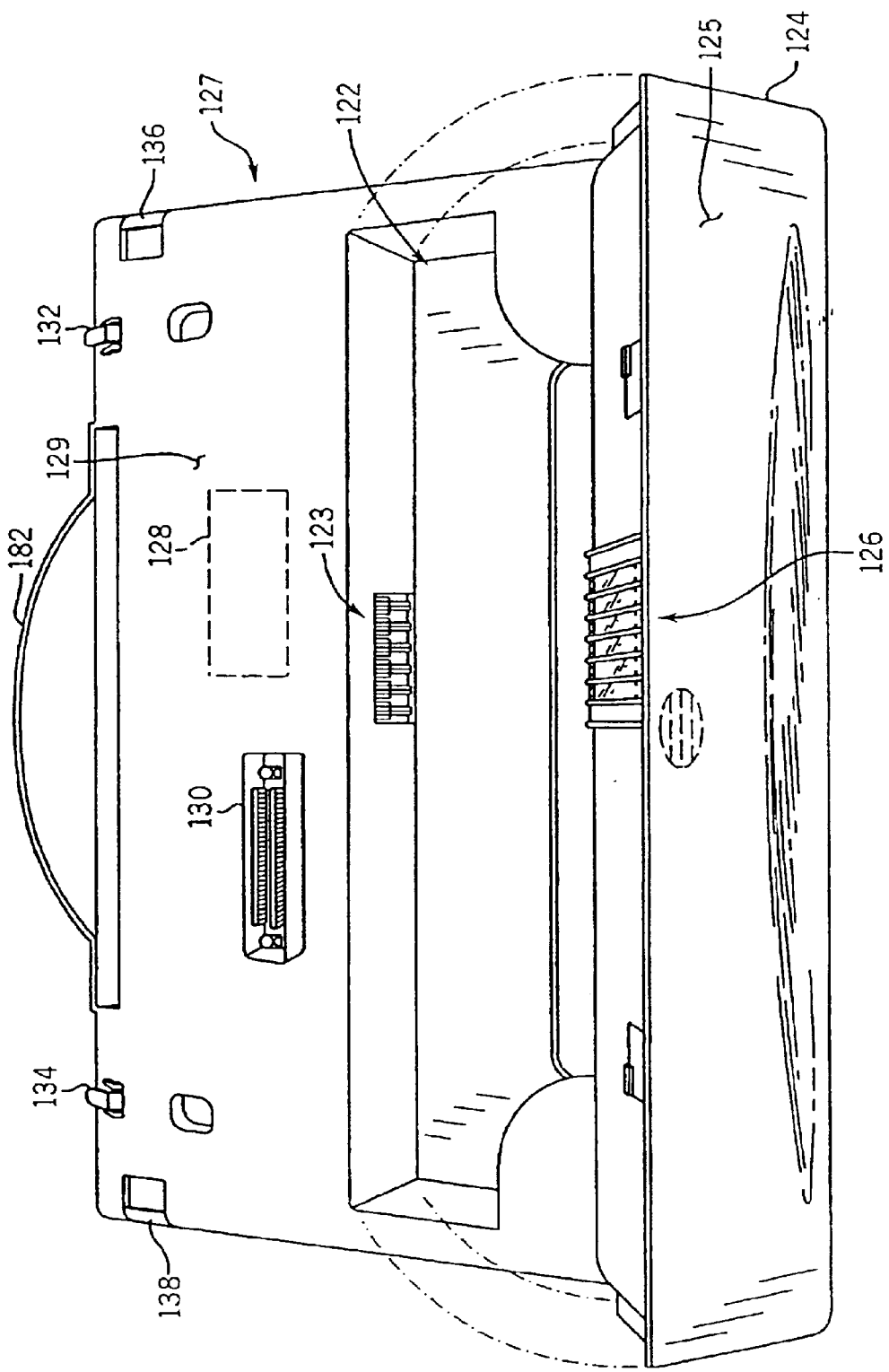
FIG. 2 is a perspective, top view of the port replicator showing the insertion of a battery into the charging cradle according to the invention.

Better shown in FIG. 2, the cradle 122 is sized and adapted to receive battery 124. When inserted into the cradle, the battery's electrodes 126 electrically mate with the charging connector 127 in the charging cradle 122.

Figure 3:
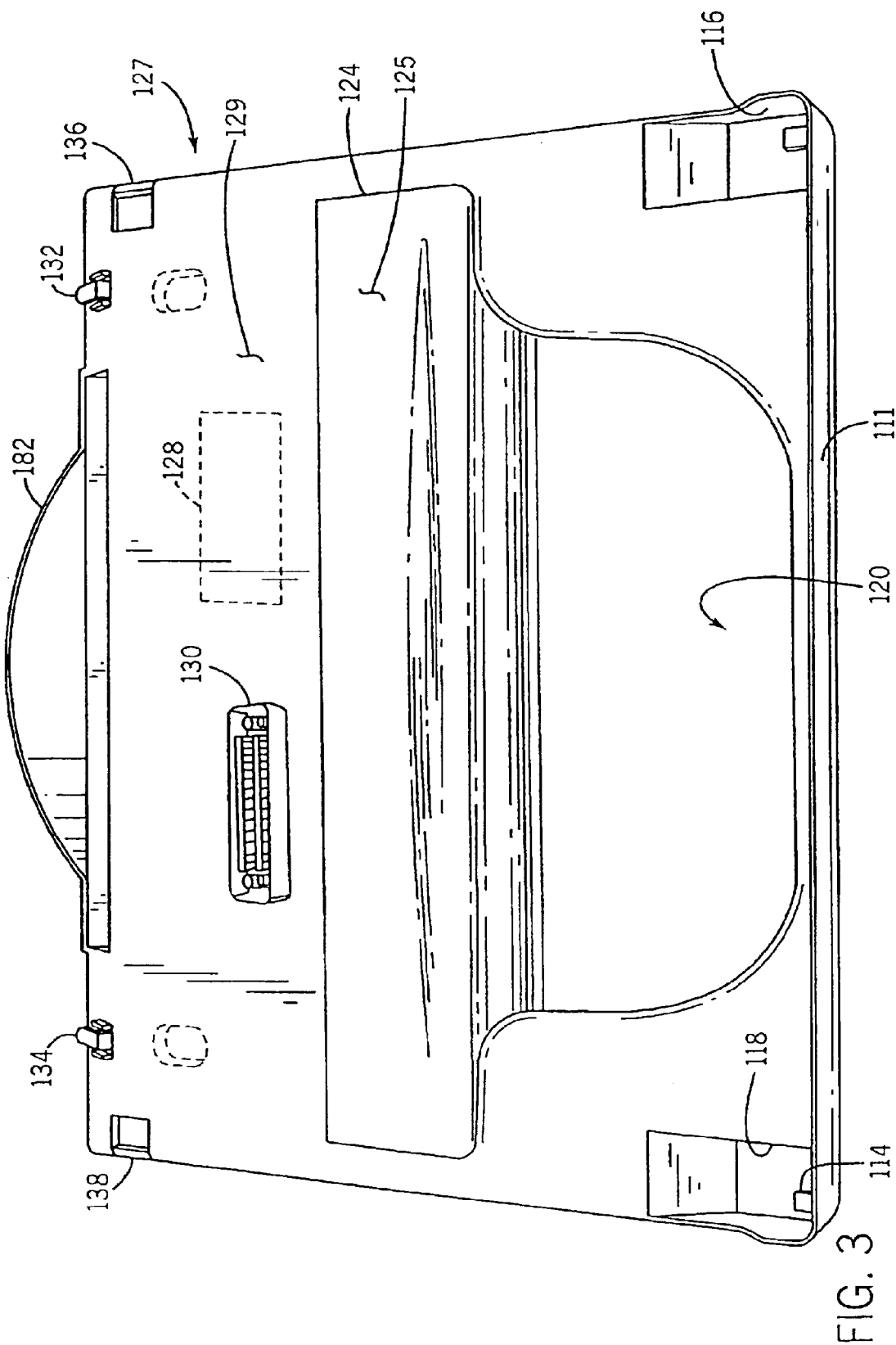
FIG. 3 is another, top perspective view of the port replicator with the battery fully inserted into the cradle according to the invention.

FIG. 3 shows the battery 124 installed in the charging cradle. Preferably, the top wall 125 of the battery 124 is flush or level with a bay wall 129 of the docking unit 100. A battery charging unit 128 is located in an electronics section 127 under bay wall 129 of the docking unit 100. In the preferred embodiment, the battery is a lithium ion battery and the charger 128 is adapted to provide the charging profile required for lithium ion batteries.

Behind the battery charging cradle 122 on the top bay wall 129 of the docking unit 100 is a combination connector 130.

Figure 4:
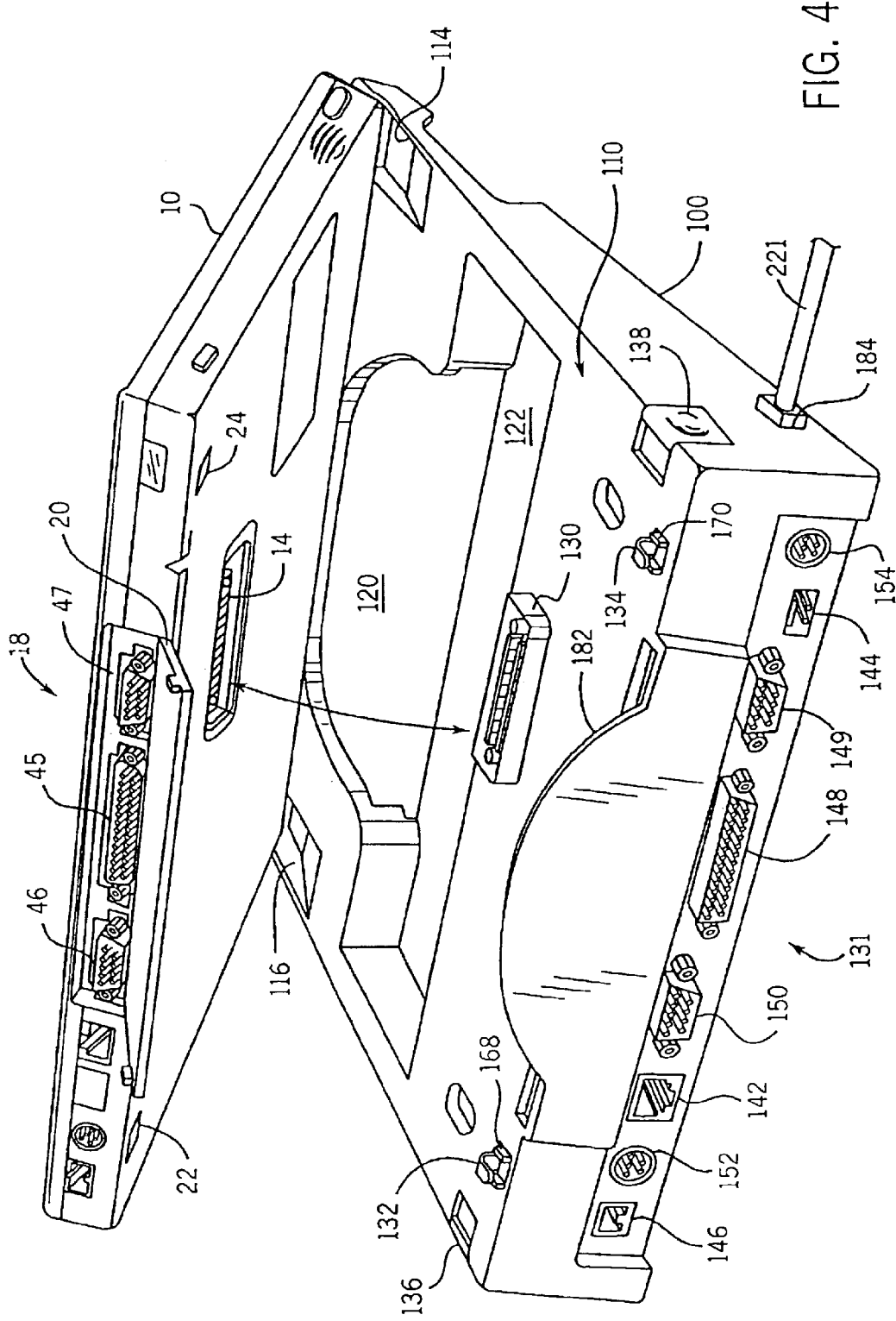
FIG. 4 shows a portable computer being connected into the port replicator of the present invention according to the invention.

As shown in FIG. 4, installing the portable computer 10 onto the docking unit is accomplished by engaging the tabs 112, 114 with the rectangular recesses 12 to provide the hinging action at the point of connection between the computer 10 and the front of the docking unit 100. As the rear portion of the computer 10 descends into the docking bay 110, the docking unit's combination connector 130 electrically mates with the compatible connector 14 on the bottom of the portable computer 10. This allows the portable computer's communication ports to be replicated at the communication port connectors 131 on the port replicator 100. Also, the combination connector 130 provides electrical power to the portable computer 10.

The rear of the docking unit 100 has the array of communication port connectors or jacks 131. Preferably, these connectors comprise an RJ-45 connector 142 for connection to a network, a USB connector 144, a power supply connector 146, a parallel printer port connector 148, a serial port connector 150, a VGA video port connector 149, mouse port connector 152, and a keyboard port connector 154. These replicated port connectors 131 function as the replicated port connectors of the portable computer installed in the docking bay area. The ports of the portable computer connect to the replicated port connectors via the combination connector 130.

In the preferred embodiment, the docking unit 100 comprises a rear wall 182 that projects upward, over the docking bay 110 at the rear side of the unit 100. This projecting wall 182 is preferably arcuate and projects in front of the communication port connectors 18 of the portable computer. This effectively prevents the simultaneous connection of devices to the portable computer's communication port connectors and the same connectors of the docking unit, preventing incompatible electrical connection. The set of communication port connectors 18 of the portable computer include a parallel printer port connector 45, a serial port connector 46, and a VGA video port connector 47. These connectors 18 are accessed during mobile operation by opening the door 20. However, as the portable computer 10 is inserted into the docking bay 110 of the docking unit 100, projecting wall 182 engages the door 20, if it is in the open position. This forces the door 20 closed as the portable computer 10 is completely seated into the docking bay 110. It thus prevents access to the communication port connectors 18 of the portable computer 10, requiring these connections to be made from the replicated port connectors 131 of the docking unit 100.

Figure 5:
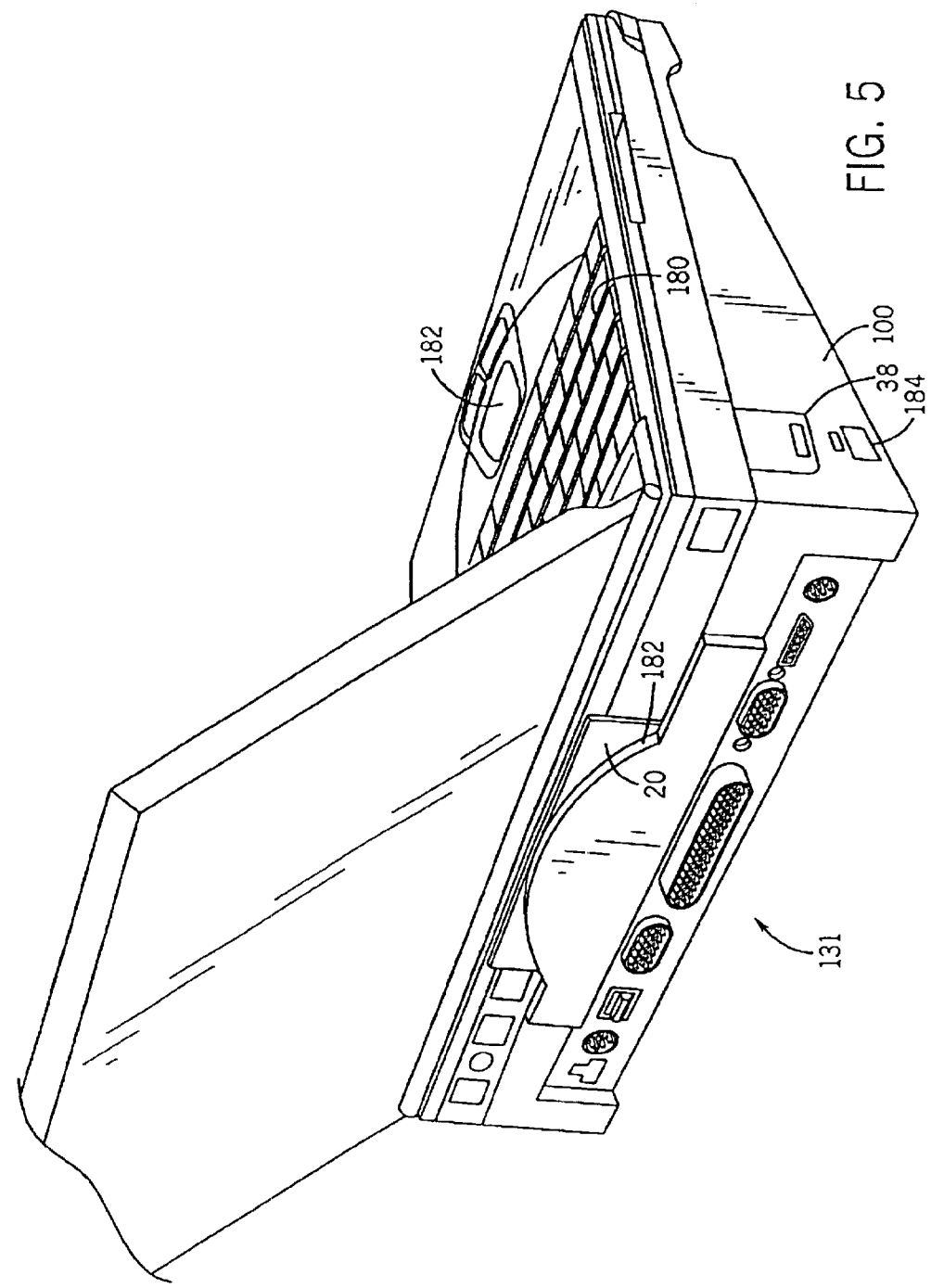
FIG. 5 shows the inventive port replicator with the portable computer installed in its docking bay.

The final docked state is shown in FIG. 5, when the computer 10 is installed on the docking unit 100, the projecting wall 182 holds the door 20 closed, preventing access to the portable computer's communication port connectors.

According to the invention, the docking unit 100 has a wedge lateral cross-section. As shown, when the portable computer 10 is installed on the docking unit, the docking unit's wedge shape inclines the portable computer's keyboard 180 and pointing device 182 towards the user at an angle of between 7° and 13°, preferably 10°. This provides a more comfortable typing angle for the user, allowing the use of the portable computer's keyboard when the portable computer is connected into the docking unit 100 without necessitating an extra, desktop-version keyboard.

As best shown in FIG. 4, docking unit 100 and portable computer 10 have a system for securing the computer to the unit. The docking unit has two latching elements 132, 134 in the docking bay 110. They allow the portable computer 10 to be latched on docking unit.

In more detail, lowering the portable computer 10 onto the docking bay causes the bottom wall of the portable computer, surrounding the right and left latching holes 22, 24 to engage latch release buttons 168, 170. This causes the latching elements 132, 134 shown in their retracted position in FIG. 4, to extend upward and toward the rear of the docking unit 100. The latching elements 132, 134 thus extend into the right and left latching holes 22, 24 of the portable computer 10 to securely hold the rear of the portable computer 10 against the docking unit 100 in the docking bay 110. This in combination with the engagement of the tabs 112, 114 at the front of the portable computer, retain the portable computer 10 securely in the docking bay 110.

The latching system forms part of a security system for the portable computer. The latching elements 132, 134 prevent the portable computer 10 from being removed from the docking unit 100, and the docking unit is, in turn, secured at a work area via a locking cable arrangement that engages locking port 184. In one example, a Kensington (trade name) cable system is used that engages the port 184 to lock and secure the docking unit 100 to a workstation via a cable 221 shown schematically.

The right and left latching elements 132, 134 release the computer 10 and are returned to the retracted position by depressing right and left latch release buttons 136, 138, respectively. In the preferred embodiment, the latch release buttons 136, 138 in combination with an undock request button 184 prevent removal of the portable computer 10 when it is docked to the docking unit 100 by unauthorized persons.

Figure 6:
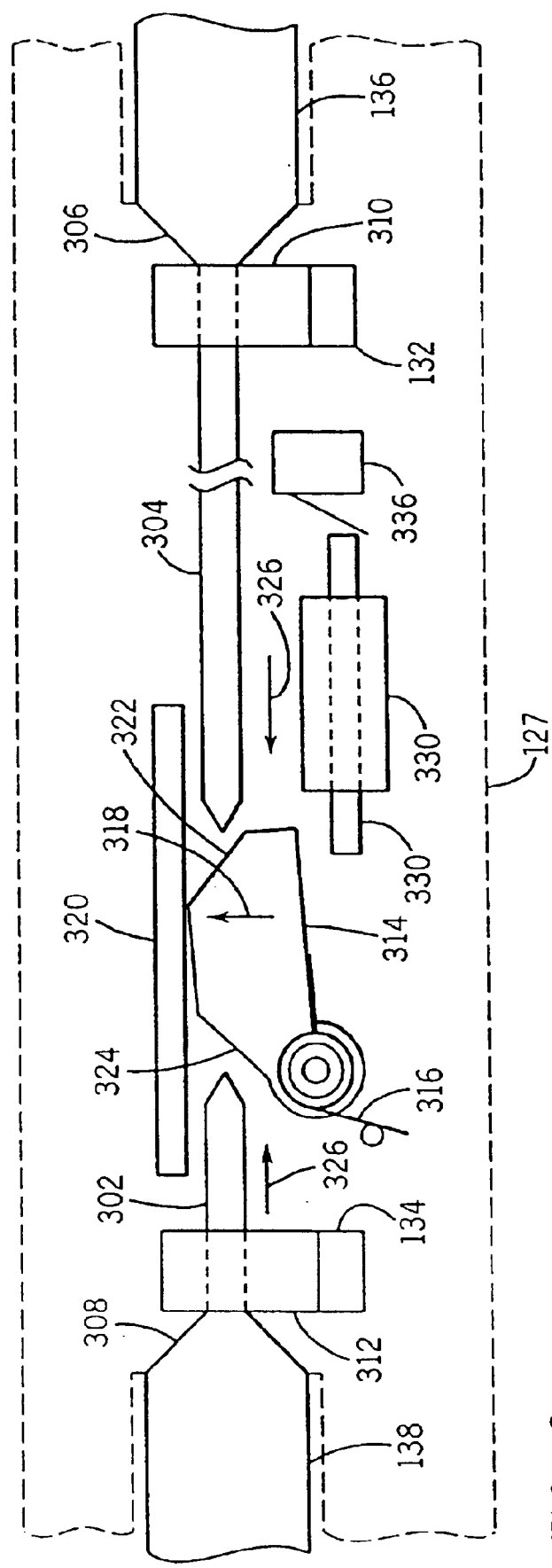
FIG. 6 is a schematic plan view showing the docking latch release system according to the present invention.

FIG. 6 is a schematic plan view showing the latch control system that operates the latching elements, which is located in the electronic section 127 of the docking unit 100, according to the present invention. The right and left latch release buttons 136, 138 each comprise elongate, metal rods 302, 304, respectively. Additionally, the body portion of the buttons 136, 138 each have camming surfaces 306, 308. When each of the latch release buttons 136, 138 is depressed, the camming surfaces 306 and 308 engage arm portions 310, 312 of the latching elements 132, 134. This causes the latching elements 132, 134 to be retracted, and thereby release the computer 10 from the docking unit 100.

In order to provide security, the depression of the latch release buttons 136, 138 is prevented in software. Specifically, each of the metal arms 302, 304 extends to a spring loaded locking element 314. Specifically, spring 316 biases the locking element 314 in the direction of arrow 318 against wall 320.

In an unlocked state, depression of of the latch release buttons 136, 138 causes the pointed, distal ends of the metal rods 304, 308 to engage the inclined surfaces 322, 324 of the locking element 314. The locking element 314 is free to rotate counter to arrow 318 to accommodate the movement of each of the rods in the direction of arrows 326.

In the locked state, however, an arm 330 of solenoid 332 is extended as shown in FIG. 6. This prevents the rotation of the locking element 314 counter to the direction of arrow 318 and thus in turn prevents the movement of the rods 302, 304 in the direction of arrows 326. By stopping the depression of buttons 136, 138, the retraction of the latching elements 132, 134 is prevented, thereby retaining the portable computer on the docking unit 100. The state of the solenoid arm 330 is sensed by switch 336.

Figure 7:
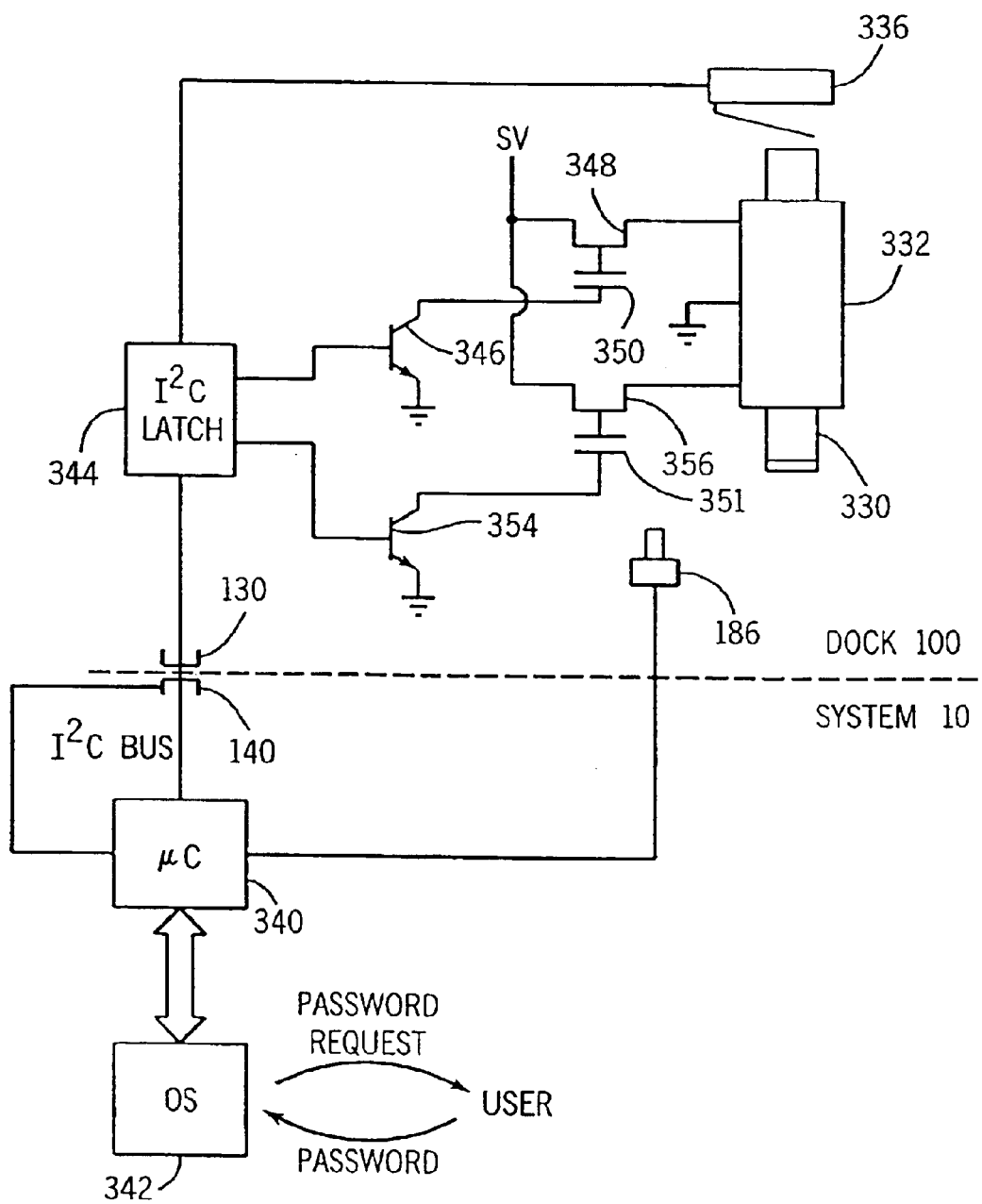
FIG. 7 is a circuit diagram showing the electronic control of the latching system of the present invention.

FIG. 7 shows a latch control system for operating the solenoid 332. Specifically, a microcontroller 342 located in the portable computer system 10 monitors for depression of the undock request button 186, which is located on the docking unit's right sidewall, see FIG. 1. When the depression of the undock request button 186 is detected, the microcontroller 342 communicates to the computer system's operating system to request the entrance of a password by the user. If the proper password is entered, the operating system 342 communicates this to the microcontroller 340, which signals, via an I$^2$C bus, a latch 344 in the dock. The latch generates a pulse to a release BJT transistor 346, which activates on retracting MOSFET 348. Capacitor 350 controls the period of time the MOSFET is turned on. This operates the solenoid 332 to retract the arm 330. Successful retraction of the arm 330 is detected by switch 336.

If the latch 344 fails to detect the change in state of the arm 330 of the solenoid 332 via switch 336, the latch again issues a pulse to BJT 346 to try to attempt to retract the arm again. This continues until the arm 330 is successfully retracted.

A similar process is used to lock the portable computer system 10 on the dock 100. The microcontroller 340 functions as a docking detection system to detect the coupling of the computer's connector 14 to the combination detector 130 on the dock 100. When this event is detected, and an automatic locking state has been selected by the user in the operating system 342, the microcontroller 340 issues a signal to latch 344 to enter a locked state. The latch generates a pulse via a locking BJT transistor 354 which operates MOSFET 356 to extend the arm 330 of the solenoid 332. Capacitor 351 maintains the on state of MOSFET 356 for the time required for the solenoid to change states. Again, the successful movement of the solenoid arm 330 is detected by the feedback from the switch 336 to latch 344. The latch continues to attempt to extend the arm 330 until it is successful. Extension of the solenoid arm prevents the rotation of the locking element 314 shown in FIG. 6. This prevents the depression of buttons 136, 138 and thus the undocking of the portable computer 10 from the docking unit 100.

In additional embodiments, the portable computer comprises a middle docking unit such that the portable computer unit is latched to the middle docking unit and the middle docking unit is latched to the port replicator. For example, such middle docking units provide extended multimedia capabilities to the portable computer. This system allows all three sections to be secured to the work area with a single locking cable.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A portable computer system, comprising:
   a portable computer having a first electrical connector disposed on a bottom portion of the portable computer and communications port connectors disposed on a rear portion of the portable computer; and
   a docking unit having a second electrical connector disposed on a top portion of the docking unit, wherein the rear side of the docking unit is substantially coextensive with the rear side of the portable computer, and wherein the docking unit comprises a wall extending upward adjacent to the rear side of the portable computer to prevent access to the communications port connectors of the portable computer when the portable computer is installed on the docking unit.

2. The portable computer system as described in claim 1, wherein the docking unit is a port replicator.

3. The portable computer system as described in claim 1, wherein the docking unit comprises replicated port connectors which replicate communication ports of the portable computer enabling the portable computer to be disconnected from peripheral devices connected to replicated port connectors of the docking unit by disconnecting the portable computer from the docking unit.

4. The portable computer system described in claim 3, comprising replicated parallel port and serial port connectors which function as replicated parallel and serial ports of the portable computer.

5. The portable computer system as described in claim 3, further comprising a replicated mouse port connector, keyboard port connector, and video port connector which function as a replicated mouse port, keyboard port, and video port of the portable computer.

6. The portable computer system as described in claim 1, wherein the communications port connectors are electrically coupled to the replicated port connectors via the first and second electrical connectors when the portable computer is installed on the docking unit.

7. The portable computer system as described in claim 6, wherein the second electrical connector of the docking unit mates with the first electrical connector of the portable computer as the portable computer is pivotally installed on the docking unit.

8. The portable computer system as described in claim 1, wherein the wall comprises a thin member that is displaced outward relative to the communication port connectors of the portable computer when the portable computer is installed on the docking unit to prevent direct access to the communications ports by a user.

9. The portable computer system as described in claim 1, wherein the docking unit comprises a battery charger for charging a battery of the portable computer.

10. The portable computer system as described in claim 1, wherein the docking unit receives the portable computer by pivoting the portable computer toward the docking unit.

11. The portable computer system as described in claim 10, wherein the docking unit inclines the portable computer.

12. The portable computer system as described in claim 10, wherein the portable computer comprises a cover and wherein the projection of the docking unit closes the cover as the portable computer is hinged toward the docking unit.

13. A base, comprising:
    a housing adapted to receive a portable commuter, wherein the housing has a rear side that is substantially coplanar with a rear side of the portable computer;
    an electrical connector disposed on a top portion of the housing, wherein the housing is adapted to receive a portable computer having a corresponding electrical connector disposed on a bottom portion of the portable computer and a plurality of electrical connectors disposed on a rear portion of the portable computer; and
    a projection extending upward from the housing to form a wall to prevent access to the plurality of electrical connectors disposed on the rear portion of the portable computer when the portable computer is disposed on the base.

14. The base as recited in claim 13, wherein the projection closes a movable cover over the plurality of electrical connectors as the portable computer is disposed on the base.

15. The base as recited in claim 13, wherein the base receives the portable computer by pivoting the portable computer toward the base.

16. The base as recited in claim 15, wherein the docking unit inclines the portable computer to enable the docking unit to have a footprint smeller than the portable computer.

17. The base as recited in claim 13, wherein the projection comprises a thin member that is displaced outward relative to the rear side of the portable computer.

18. A method of assembling a portable computer system, comprising the act of:
    disposing a front portion of a portable computer on a docking unit; and
    pivoting the portable computer toward the docking unit to connect an electrical connector disposed on a bottom portion of a portable computer to a corresponding electrical connector disposed on a top portion of a docking unit, whereupon a projection extending upward from the docking unit is disposed adjacent to at least one communication port disposed on a rear portion of the portable computer to obstruct access to the at least one communication port.

19. The method as recited in claim 18, further comprising connecting a cable to a communications port disposed on the rear of the docking unit to electrically couple an external device to the portable computer.

* * * * *